(12) United States Patent
Morliere et al.

(10) Patent No.: US 11,879,341 B2
(45) Date of Patent: Jan. 23, 2024

(54) TURBINE FOR A TURBINE ENGINE

(71) Applicant: SAFRAN AIRCRAFT ENGINES, Paris (FR)

(72) Inventors: Simon Nicolas Morliere, Moissy-Cramayel (FR); Nicolas Jean-Marc Marcel Beauquin, Moissy-Cramayel (FR); Stéphane Sylvain Bois, Moissy-Cramayel (FR); Sébastien Philippe Edith Bourgeois, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/996,038

(22) PCT Filed: Apr. 12, 2021

(86) PCT No.: PCT/FR2021/050639
§ 371 (c)(1),
(2) Date: Oct. 12, 2022

(87) PCT Pub. No.: WO2021/209707
PCT Pub. Date: Oct. 21, 2021

(65) Prior Publication Data
US 2023/0184126 A1    Jun. 15, 2023

(30) Foreign Application Priority Data
Apr. 15, 2020 (FR) ...................... 2003785

(51) Int. Cl.
*F01D 9/04* (2006.01)
*F01D 11/12* (2006.01)
*F01D 25/24* (2006.01)

(52) U.S. Cl.
CPC .............. *F01D 11/122* (2013.01); *F01D 9/04* (2013.01); *F01D 25/24* (2013.01);
(Continued)

(58) Field of Classification Search
CPC .... F01D 11/001; F01D 11/005; F01D 11/006; F01D 11/008; F01D 9/04; F01D 9/042;
(Continued)

(56) References Cited

U.S. PATENT DOCUMENTS 8,961,117 B2 * 2/2015 Garin .................... F01D 11/005
415/177
9,803,491 B2 * 10/2017 Clouse .................. F01D 25/246
(Continued)

FOREIGN PATENT DOCUMENTS

DE   10 2006 044147 A1   3/2007
EP   2 060 743 A1   5/2009
(Continued)

OTHER PUBLICATIONS

English translation of Written Opinion dated Jun. 18, 2021, issued in corresponding International Application No. PCT/FR2021/050639, filed Apr. 12, 2021, 7 pages.
(Continued)

*Primary Examiner* — David E Sosnowski
*Assistant Examiner* — Maxime M Adjagbe
(74) *Attorney, Agent, or Firm* — CHRISTENSEN O'CONNOR JOHNSON KINDNESS PLLC

(57) ABSTRACT

A turbine for a turbine engine extending along an axis includes an annular casing and at least one turbine stage having a nozzle and a rotor impeller wheel surrounded by a sealing ring with an abradable element. The impeller wheel and the sealing ring are located downstream of the nozzle, and the sealing ring has an upstream end held on the casing by locking means. The turbine includes elastic sealing means in contact with the locking means as well as with the nozzle or the casing so as to press the locking means against the sealing ring. The locking means includes a radially outer portion with a C-shaped cross-section and a radial portion extending radially inwards from the outer portion. The sealing means include two elastic seals bearing on the radial portion, respectively, on either side of the radial portion.

9 Claims, 5 Drawing Sheets

(52) U.S. Cl.
CPC .... *F05D 2220/323* (2013.01); *F05D 2240/11* (2013.01); *F05D 2240/12* (2013.01); *F05D 2240/14* (2013.01); *F05D 2240/55* (2013.01)

(58) Field of Classification Search
CPC .............. F01D 9/041; F05D 2240/128; F05D 2240/55; F05D 2260/38
See application file for complete search history.

(56) References Cited

U.S. PATENT DOCUMENTS

| | | | |
|---|---|---|---|
| 10,400,619 B2* | 9/2019 | Shapiro | F01D 25/246 |
| 2012/0107122 A1* | 5/2012 | Albers | F01D 11/005 |
| | | | 416/179 |
| 2014/0147264 A1* | 5/2014 | Belmonte | F01D 25/246 |
| | | | 415/208.2 |

FOREIGN PATENT DOCUMENTS

| | | |
|---|---|---|
| EP | 2 060 751 A1 | 5/2009 |
| EP | 3 124 750 A1 | 2/2017 |
| EP | 3 502 425 A1 | 6/2019 |
| FR | 2 978 197 A1 | 1/2013 |
| WO | 2015/112662 A1 | 7/2015 |

OTHER PUBLICATIONS

International Preliminary Report on Patentability dated Oct. 13, 2022, issued in corresponding International Application No. PCT/FR2021/050639, filed Apr. 12, 2021, 7 pages.

International Search Report dated Jun. 18, 2021, issued in corresponding International Application No. PCT/FR2021/050639, filed Apr. 12, 2021, 7 pages.

Written Opinion dated Jun. 18, 2021, issued in corresponding International Application No. PCT/FR2021/050639, filed Apr. 12, 2021, 6 pages.

* cited by examiner

US 11,879,341 B2

TURBINE FOR A TURBINE ENGINE

FIELD OF THE DISCLOSURE

The disclosure relates to a turbine for a turbine engine, such as an airplane turbojet or turboprop.

BACKGROUND

A turbine engine conventionally includes, from upstream to downstream in the direction of gas flow in the turbine engine, a fan, a low-pressure compressor, a high-pressure compressor, a combustion chamber, a high-pressure turbine, a low-pressure turbine and a gas exhaust jet nozzle.

A low-pressure turbine 1 for a turbine engine according to the prior art is illustrated in FIGS. 1 and 2. The latter includes four stages each comprising a nozzle 2 formed from an annular row of fixed blades 3 borne by an outer casing 4 of the turbine 1, and an impeller wheel 5 located downstream from the nozzle 2.

The wheels 5 include disks 6 assembled axially in relation to each other with annular clamps 7 and bearing radial vanes 8. These wheels 5 are connected to a turbine shaft not shown, by means of a drive cone 9 fastened to the annular clamps 7 of the disks 6.

The terms axial, radial and circumferential are defined in relation to the turbine engine axis, which is merged with the axis of the low-pressure turbine 1.

Each wheel 5 is surrounded externally with a small gap by a sealing ring 10 made of abradable material. The ring 10 is formed by sectors fastened circumferentially to the casing 4 of the turbine 1 by means of locking members 12. Each sector includes a radially outer support 13 and a radially inner block of abradable material 14, fastened to the support 13.

The nozzles 2 comprise radially inner 15 and outer 16 shells which delimit therebetween the annular gas flow jet 17 in the turbine 1 and between which the blades 3 extend.

The support 13 includes an upstream tab 18 engaged in a groove 19 of an upstream rail 20 of the casing 4. The tab 18 is held in position in the groove 19 using a locking member 12 in a general C shape. The locking member 12 is held axially by a downstream edge 21 of the outer shell 16 of the nozzle 2 located directly upstream.

This downstream edge 21 includes an axial portion 22 engaged in a groove 23 formed by a rail 24 of the casing 11. An elastic sealing member 25 is moreover mounted between the casing 4 and the downstream edge 21, the member tending to push the edge 21 back towards the downstream, bearing on the locking member 12.

The downstream end of the support 13 is kept bearing on a downstream rail 26 of the casing 4, by means of the nozzle 2 located downstream.

The rotor vanes 8 include a radially outer platform 27 from which extend strips 28 cooperating with the block of abradable material 14 so as to form a dynamic seal.

In order to improve the performances of the turbine engine, it is necessary to limit leakage flows in the zones located between the sealing ring 10, the casing 4 and the nozzles 2 upstream and downstream. For this, an upstream annular sealing plate 29 is mounted on the support 13 of the sealing ring 10 and extending in the upstream direction in the gap formed between the upstream end of the sealing ring 10 and the downstream edge 21.

Moreover, a downstream annular sealing plate 30 is mounted between the downstream end of the support 13 and the downstream rail 26 of the casing 4, the downstream sheet 30 extending in the upstream direction between the support 13 and the casing 4, so as to extend in the annular space formed between these elements.

The plates 29, 30 are formed from angular sectors placed circumferentially end-to-end so as to form a seal on the entire circumference. However, there is no overlap between the circumferential ends of the plates 29, 30, such that a leakage flow appears in operation between the different sectors of the plates 29, 30.

It is necessary to ensure good sealing at these plates 29, 30.

It has moreover been observed that the nozzle 2 located downstream is subject to high thermomechanical stress. Such stress is particularly due to temperature differences between the radially inner zone of the outer shell 16 of the nozzle 2 and the radially outer end of the downstream edge 21. Such stress affects not only the outer shell 16 but also the blade 3. It is also desirable to hold the locking members 12 in position reliably in order to improve the sealing at the interface between the nozzle 2, the casing 4 and the sealing ring 10.

SUMMARY

The aim of the disclosure is to remedy the drawbacks cited above simply, reliably and inexpensively.

To this end, the disclosure relates to a turbine for a turbine engine extending along an axis, including an annular casing and at least one turbine stage comprising a nozzle and a rotor impeller wheel surrounded by a sealing ring including an abradable element, the impeller wheel and the sealing ring being located downstream from the nozzle, the sealing ring including an upstream end held on the casing by locking means, characterized in that it includes elastic sealing means in contact with the locking means as well as with the nozzle or the casing so as to press the locking means against the sealing ring.

The terms axial, radial and circumferential are defined in relation to the turbine engine axis, which is merged with the axis of the low-pressure turbine.

The sealing means also perform the function of holding the locking means.

Thanks to the elastic sealing means, the locking means are held in position, which ensures improved sealing.

The sealing means can include at least one axially deformable annular seal.

The use of a deformable, particularly elastically deformable, seal makes it possible to allow slight axial movement of the elements in relation to each other. Such a deformable seal can also perform an axial return function and can exert an axial force.

The locking means can include a portion with a generally C-shaped cross-section.

The sealing means can include at least one annular seal located radially inside the portion with a generally C-shaped cross-section.

The locking means can include a radially outer portion with a generally C-shaped cross-section and a radial portion extending radially inward from the outer portion, the sealing means including two elastic seals bearing on the radial portion, respectively on either side of the radial portion.

The sealing ring can comprise a portion extending axially upstream, located at least partially axially facing the locking means and/or sealing means.

The axially extending portion can extend axially upstream from the locking means and/or sealing means.

The sealing ring can be sectorized and can include a plurality of sectors arranged end-to-end on the circumference, sealing elements extending between the ends of the circumferentially adjacent ring sectors.

The sealing elements can be formed by strips or foils.

The sealing elements can be located at least in the portion of the sealing ring extending axially upstream.

The sealing elements thus make it possible to improve the thermal protection of the sealing means and the locking means, preventing them from being subject to hot gas flows from the gas flow jet.

The nozzle can include a radially outer shell and a radially inner shell, connected by radial blades, the outer shell including at least one downstream edge extending radially outward from the outer shell and mounted on the casing, the edge extending axially, at least partially, facing the locking means.

The nozzle can include a radially outer shell and a radially inner shell connected by radial blades, the outer shell including at least one downstream edge extending radially outward from the outer shell and mounted on the casing, the radially outer end of the downstream edge being located radially inside the locking means.

In this way, it is possible to reduce the radial size of the edge, which limits the thermomechanical stress applied to the nozzle in operation, due in particular to temperature gradient or difference effects. The sealing ring can include a tab held radially bearing and axially bearing on a portion of the casing, by locking means.

The tab thus serves to form a radial stop and an axial stop, the positioning of the tab in relation to the casing being carried out by the locking means.

The turbine according to the disclosure can include one or more of the following features, taken separately or combined, provided that the combinations of features are technically compatible:

The sealing means are annular and continuous, so as to ensure sealing on the entire circumference, unlike discontinuous sealing means, as they are sectorized and have no circumferential overlap, of the prior art, The sealing means are located, at least partially, radially inside the locking means, so as to protect the locking means due to the radially inner position thereof in relation to the locking means. In particular, the sealing means make it possible to limit the heating of the locking means by a hot gas leakage flow from the gas flow jet from the combustion chamber and passing through the turbine.

The nozzle is sectorized,

The outer shell of the nozzle includes an upstream edge and a downstream edge each extending radially outward from the outer shell, The radially inner surface of the outer shell is frustoconical and flares in the downstream direction. This surface is intended to delimit the gas flow jet in the turbine.

The upstream edge is mounted on a rail of the casing,

The downstream edge is mounted on a rail of the casing

The casing includes a frustoconical portion, each rail extending radially inside the frustoconical portion, Each rail extends in the downstream direction from the frustoconical portion, The radially outer end of the upstream edge radially bears on an upstream rail of the casing, A portion of the downstream edge, for example the radially outer end, radially bears on a downstream rail of the casing, The downstream edge includes an axial portion extending in the upstream direction from a radial portion of the downstream edge, the axial portion being engaged by shape complementarity in a groove provided in the casing, The radial supports of the rims and the rails are formed by cylindrical surfaces, The casing includes an upstream portion and a downstream portion fastened to one another, The upstream portion of the casing surrounds the nozzle, The downstream portion of the casing surrounds the sealing ring and the impeller wheel, The upstream portion and the downstream portion are fastened to one another at radial clamps of the portions, The casing includes an upstream rail for mounting an upstream tab of the sealing ring, The casing includes a downstream rail for mounting a downstream zone of the sealing ring, The upstream rail for mounting the sealing ring extends axially in the upstream direction, The sealing ring includes an upstream tab comprising a cylindrical surface bearing on a radially inner cylindrical surface of the corresponding upstream rail and a radial surface bearing on an upstream radial surface of the corresponding upstream rail, The downstream zone of the sealing ring includes a cylindrical surface bearing on a complementary cylindrical surface of the corresponding downstream rail, The sealing ring includes a radially outer support and a radially inner block of abradable material, fastened to the support, The sealing elements are engaged in slots provided at the circumferential ends of the sealing ring sectors.

The sealing elements extend along most of the axial dimension of the sectors, for example along at least 50%, preferably at least 80% of the axial dimension, The sealing ring includes a radially inner surface including at least an upstream cylindrical zone and a downstream cylindrical zone, the diameter of the upstream zone being less than the diameter of the downstream zone, Each vane of the impeller wheel includes an outer platform from which at least an upstream strip and a downstream strip extend radially outward, The outer platform is frustoconical and flares in the downstream direction, The upstream strip cooperates with the upstream cylindrical zone of the sealing ring, the downstream strip cooperating with the downstream cylindrical zone, The turbine includes at least one locking member, for example several locking members regularly distributed along the circumference, each locking member including a generally C-shaped locking zone, The locking zone includes a radially outer axial branch and a radially inner axial branch, connected by a radial base, The radially outer branch bears radially on the radially outer surface of the corresponding upstream rail of the casing, The radially inner branch bears on an upstream tab of the sealing ring, The inner and outer branches make it possible to keep the tab radially bearing on the corresponding upstream rail, The base bears on the upstream end of the tab, so as to press the upstream end of the tab on the upstream end of the corresponding upstream rail of the casing, The tab includes an axially extending portion extending in the upstream direction from a main zone of the sealing ring, the axial portion radially bearing on the corresponding upstream rail of the casing, The tab includes a portion extending radially outward from the upstream end of the radial portion of the tab, The radial portion is configured to bear on the upstream end of the upstream rail of the casing, The locking member includes a positioning or centering zone extending radially inward from the locking zone. The locking means only denote the locking zone and not the positioning and centering zone.

The locking zone and the positioning zone are formed from one piece or, on the other hand, from at least two pieces fastened to one another, The positioning zone can include a portion extending radially inward from the locking zone and a cylindrical portion extending axially on either side of the radially inner end of the radial portion, A first annular sealing member extends axially between a radial face of the downstream edge of the nozzle and the positioning zone, A second annular sealing member extends axially between the positioning zone and a radial face of the sealing ring, The first annular member and/or the second annular member are elastically deformable in the axial direction, The first annular member and/or the second annular member have a generally omega- or W-shaped cross-section.

The first and second sealing members belong to the sealing means,

An annular edge extends axially in the downstream direction from the radial face of the downstream edge of the nozzle, An annular edge extends axially in the upstream direction from the radial face of the sealing ring, Alternatively, a first annular sealing member extends axially between the locking means, for example the base of the locking zone, and a radial face of the casing, A second sealing member extends axially between a radial face of the sealing ring and a radial face of the casing, The first sealing member and/or the second sealing member are housed in a groove of the casing, The first sealing member and the second sealing member are axially offset in relation to each other, The radially outer end of the downstream edge of the nozzle is located radially inside the first sealing member, the second sealing member and/or the locking means, An intermediate element is mounted on the casing downstream from the downstream edge, The inner element is positioned with respect to the downstream edge by means of at least one positioning or centering block, The intermediate element extends radially. The use of an intermediate element rather than a downstream edge of large radial dimension makes it possible to limit the effect of thermal differences between the different zones of the turbine, The radially outer periphery of the intermediate element is fastened between a radial clamp of a first portion of the casing and a radial clamp of a second portion of the casing, The intermediate element includes an axial edge extending in the upstream direction, radially bearing on a cylindrical surface of the casing, An annular sealing member, for example elastically deformable in the radial direction, for example with a W- or omega-shaped cross-section, is mounted between the downstream edge and the intermediate element, The sealing member is mounted in a groove of the intermediate element, The first sealing member and the second sealing member are located in the same radial plane, A sealing plate is mounted between the outer periphery of the sealing ring and the casing, The sealing plate includes an upstream and fastened at the outer periphery of the sealing ring and a downstream end mounted radially between the sealing ring and the corresponding downstream rail of the casing.

The disclosure also relates to a turbine engine including a turbine cited above.

The disclosure also relates to an aircraft including a turbine or a turbine engine of the type cited above. The aircraft is for example an airplane.

DETAILED DESCRIPTION

Figure 1:
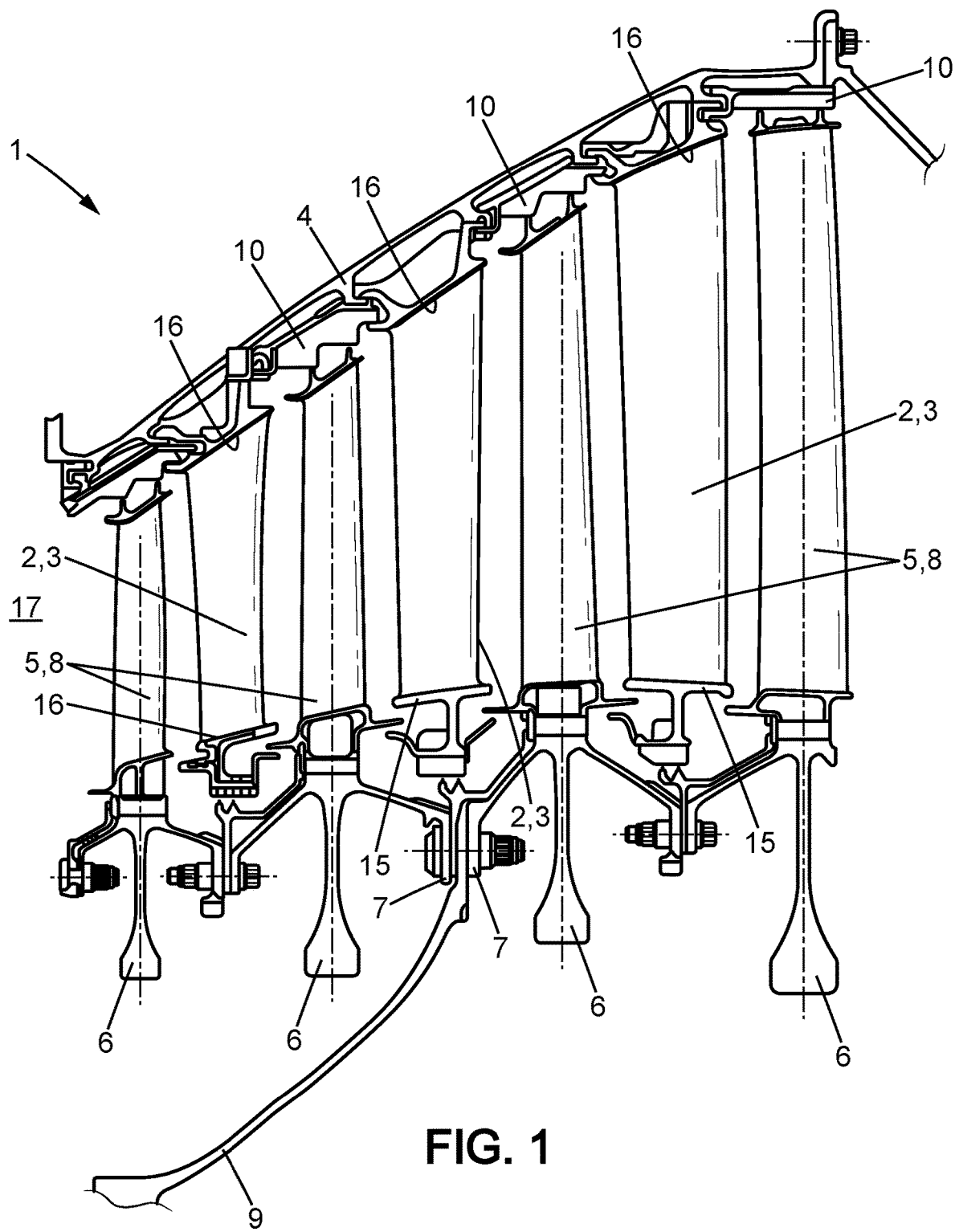
FIG. 1 is an axial sectional half-view of a turbine engine turbine.
Figure 2:
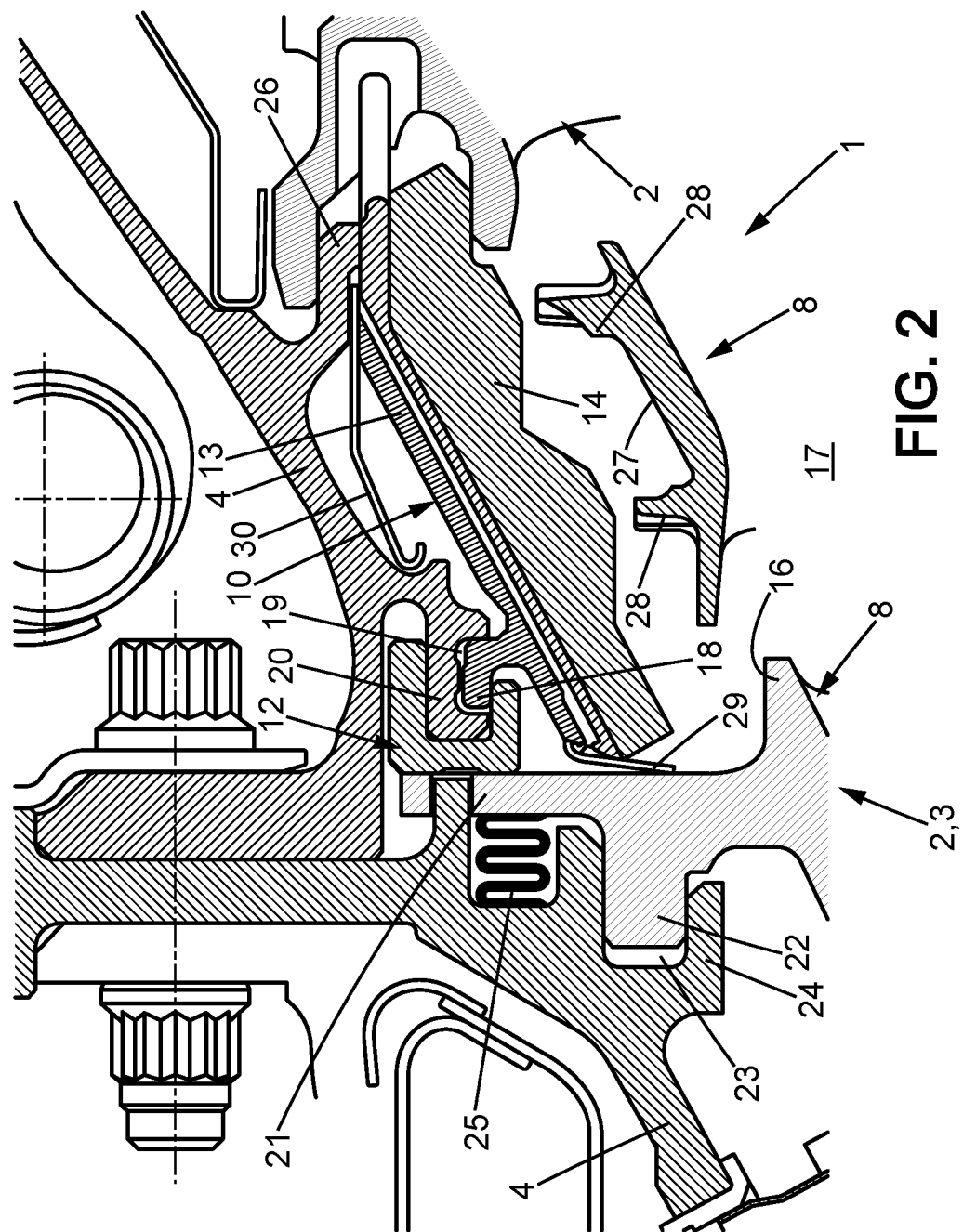
FIG. 2 is a sectional view of a portion of the turbine according to the prior art.
Figure 3:
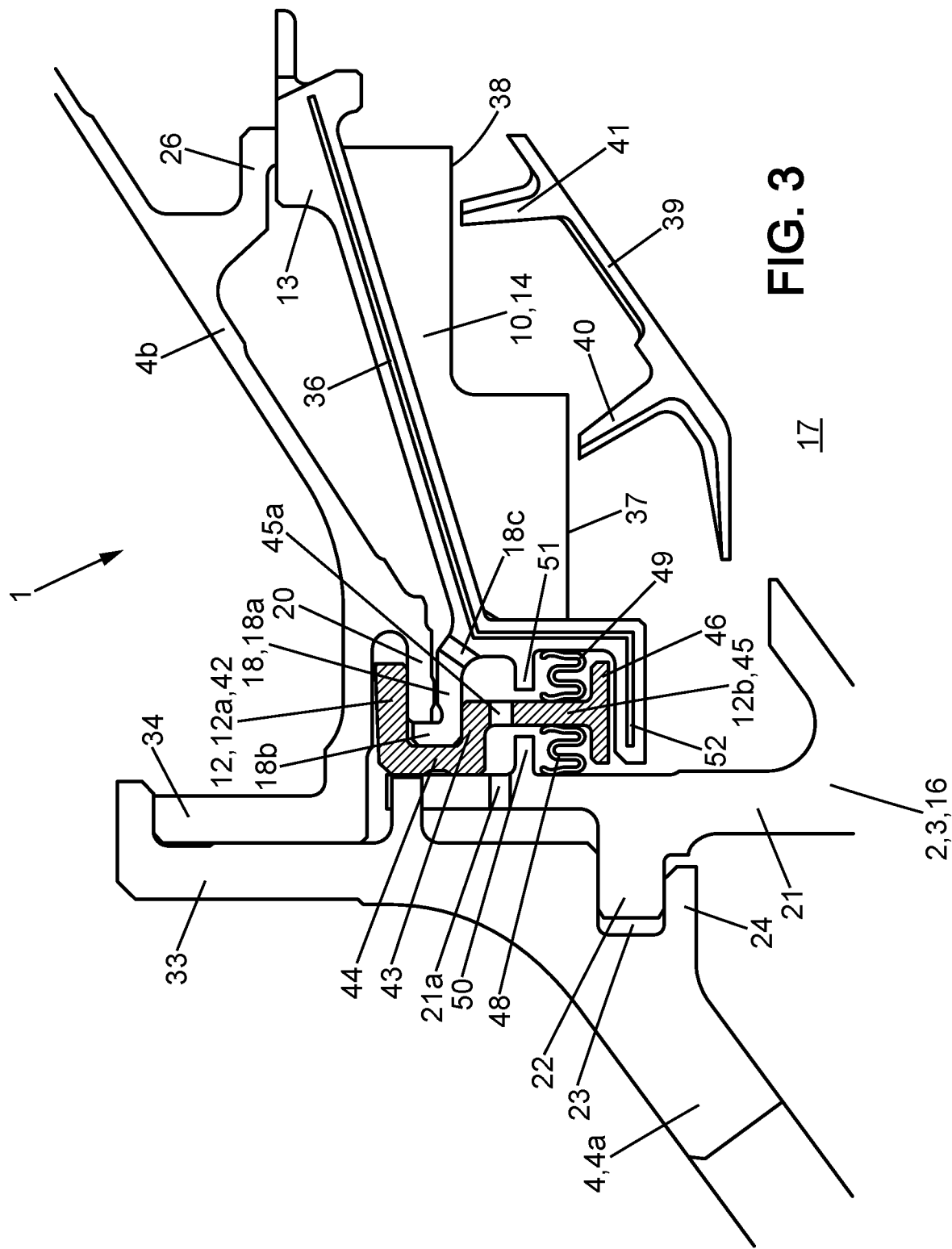
FIG. 3 is a sectional view of a portion of the turbine according to a first embodiment of the disclosure.

FIG. 3 illustrates a portion of a turbine 1 according to a first embodiment of the disclosure. The latter includes an annular casing 4 and at least one turbine stage comprising a nozzle 2 and an impeller wheel 5 surrounded by a sealing ring 10, the impeller wheel 5 and the ring 10 being located downstream from the nozzle 2.

The nozzle 2 is sectorized. The outer shell 16 of the nozzle 2 includes an upstream edge 31 (seen in FIG. 4) and a downstream edge 21 each extending radially outward from the outer shell 16.

The radially inner surface 32 of the outer shell 16 is frustoconical and flares in the downstream direction. This surface 32 is intended to delimit the gas flow jet 17 in the turbine 1.

The upstream edge 31 is mounted on an upstream rail 32 of the casing 4. Similarly, the downstream edge 21 is mounted on a downstream rail 24 of the casing 4.

The casing 4 includes two portions, respectively upstream 4a and downstream 4b, each comprising a frustoconical wall and a fastening clamp 33, 34.

The upstream portion 4a of the casing 4 surrounds the nozzle 2. The downstream portion 4b of the casing 4 surrounds the sealing ring 10 and the impeller wheel 5.

The two portions 4a, 4b are fastened to one another at the clamps 33, 34. Each rail 32, 24 extending radially inside the frustoconical wall of the first portion 4a. Each rail 32, 24 extends in the downstream direction from the frustoconical wall.

The radially outer end of the upstream edge 31 radially bears on a radially outer cylindrical surface of the upstream rail 32 of the first portion 4a.

A portion of the downstream edge 21, for example the radially outer end 22, radially bears on a downstream rail 24 of the casing 4. In particular, the downstream edge 21 includes an axial portion 22 extending in the upstream direction from a radial portion of the downstream edge 21, the axial portion 22 being engaged by shape complementarity in a groove 23 provided in the casing 4 and forming the downstream rail 24.

The second portion 4b of the casing 4 includes an upstream rail 20 for mounting an upstream tab 18 of the sealing ring 10. The portion 4b of the casing 4 furthermore includes a downstream rail 26 for mounting a downstream zone of the sealing ring 10.

The upstream rail 20 extends axially in the upstream direction. The downstream zone of the sealing ring 10 includes a cylindrical surface bearing on a complementary cylindrical surface of the downstream rail 26.

The sealing ring 10 includes a radially outer support 13 and a radially inner block of abradable material 14, fastened to the support 13.

The sealing ring 10 is sectorized. Sealing elements 36, for example strips or foils, are engaged in slots provided at the circumferential ends of the sectors of the sealing ring 10.

The sealing elements 36 extend along most of the axial dimension of the sectors, for example along at least 50%, preferably at least 80% of the axial dimension.

The sealing ring 10 includes a radially inner surface including at least an upstream cylindrical zone 37 and a downstream cylindrical zone 38, the diameter of the upstream zone 37 being less than the diameter of the downstream zone 38.

Each vane 8 of the impeller wheel 5 includes an outer platform 39 from which at least an upstream strip 40 and a downstream strip 41 extend radially outward. The outer platform 39 is frustoconical and flares in the downstream direction. The upstream strip 40 cooperates with the upstream cylindrical zone 37 of the sealing ring 10, the downstream strip 41 cooperating with the downstream cylindrical zone 38.

The turbine 1 includes at least one locking member 12, for example several locking members 12 regularly distributed along the circumference, each locking member 12 including a generally C-shaped locking zone 12a.

The locking zone 12a includes a radially outer axial branch 42 and a radially inner axial branch 43, connected by a radial base 44. The radially outer branch 42 bears radially on the radially outer surface of the corresponding upstream rail 20 of the casing 4. The radially inner branch 43 bears on an upstream tab 18 of the sealing ring 10. The inner 43 and outer 42 branches make it possible to keep the tab 18 bearing on the corresponding upstream rail 20. The base 44 bears on the upstream end 18 of the tab, so as to press the upstream end of the tab 18 on the upstream end of the corresponding upstream rail 20 of the casing 4.

The tab 18 of the sealing ring 10 includes a portion 18a extending axially in the upstream direction from a main zone of the sealing ring 10, the axial portion 18a radially bearing on the corresponding upstream rail 20 of the casing 4. The tab 18 furthermore includes a portion 18b extending radially outward from the upstream end of the radial portion 18a of the tab 18. The radial portion 18b is configured to bear on the upstream end of the upstream rail 20 of the casing 4.

The locking member 12 includes a positioning or centering zone 12b extending radially inward from the locking zone 12a.

The locking zone 12a and the positioning zone 12b are formed from one piece or, on the other hand, from at least two pieces fastened to one another. The positioning zone 12b includes a portion 45 extending radially inward from the locking zone 12a and a cylindrical portion 46 extending axially on either side of the radially inner end of the radial portion 45.

A first annular sealing member 48 extends axially between a radial face of the downstream edge 21 of the nozzle 2 and the positioning zone 12b. A second annular sealing member 49 extends axially between the positioning zone 12b and a radial face of the sealing ring 10. The first annular member 48 and/or the second annular member 49 are elastically deformable in the axial direction. The first annular member 48 and/or the second annular member 49 have a generally omega- or W-shaped cross-section.

An annular edge 50 edge extends axially in the downstream direction from the downstream edge 21 of the nozzle 2. An annular edge 51 edge extends axially in the downstream direction from the sealing ring 10. The edges 50, 51 are located radially outside the sealing members 48, 49.

The sealing ring 10 includes a portion 52 extending axially in the upstream direction, located at least partially facing the sealing members 48, 49 and the locking member 12. The sealing elements 36 also extend in the axial portion 52.

It will be noted that holes or bores 21a, 45a and 18c are formed respectively in the downstream edge 21, the radial portion 45 and the upstream tab 18, these holes or bores allowing the flow of a cooling or ventilation air stream.

The sealing members 48, 49 and the sealing elements 36 ensure sealing on the entire circumference, unlike the discontinuous sealing means, as they are sectorized and have no circumferential overlap, of the prior art. These sealing members and elements 48, 49, 36 also make it possible to protect the locking means 12a due to the radially inner position thereof in relation to the locking means 12a. In particular, they make it possible to limit the heating of the locking means 12a by a hot gas leakage flow from the gas flow jet 17 from the combustion chamber and passing through the turbine 1.

Moreover, such a structure is adapted for a mounting of the elements cited above of the turbine 1 via the upstream.

Figure 4:
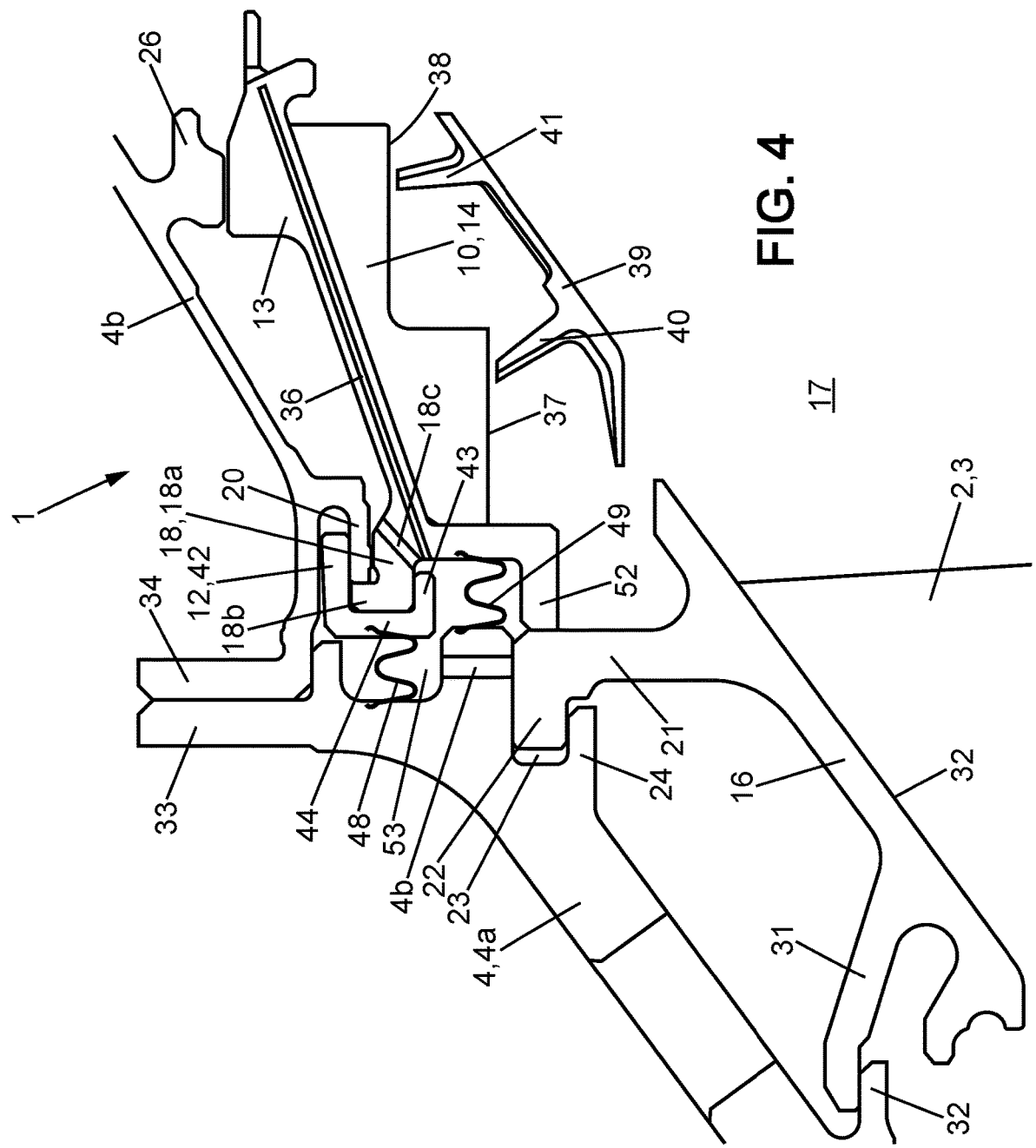
FIG. 4 is a sectional view of a portion of the turbine according to a second embodiment of the disclosure.

FIG. 4 illustrates a second embodiment of the disclosure, which differs from that described above with reference to FIG. 3 by the features described hereinafter. In this embodiment, the locking member 12 only includes a C-shaped locking zone 12a.

A first annular sealing member 48 extends axially between the base 44 of the locking member 12 and a radial face of the casing 4. A second sealing member 49 extends axially between a radial face of the sealing ring 10 and a radial face of the casing 4. The first sealing member 48 is housed in a groove 53 of the casing 4. The first sealing member 48 and the second sealing member 49 are axially offset in relation to each other.

The radially outer end of the downstream edge 21 of the nozzle 2, formed by the axial portion 22, is located radially inside the first sealing member 48, the second sealing member 49 and the locking member 12. Some portions can be scalloped, i.e. include hollow zones, in order to facilitate air flow. Holes or bores 4b and 18c are formed respectively in the casing and the upstream tab 18, these holes or bores allowing the flow of a cooling or ventilation air stream.

Figure 5:
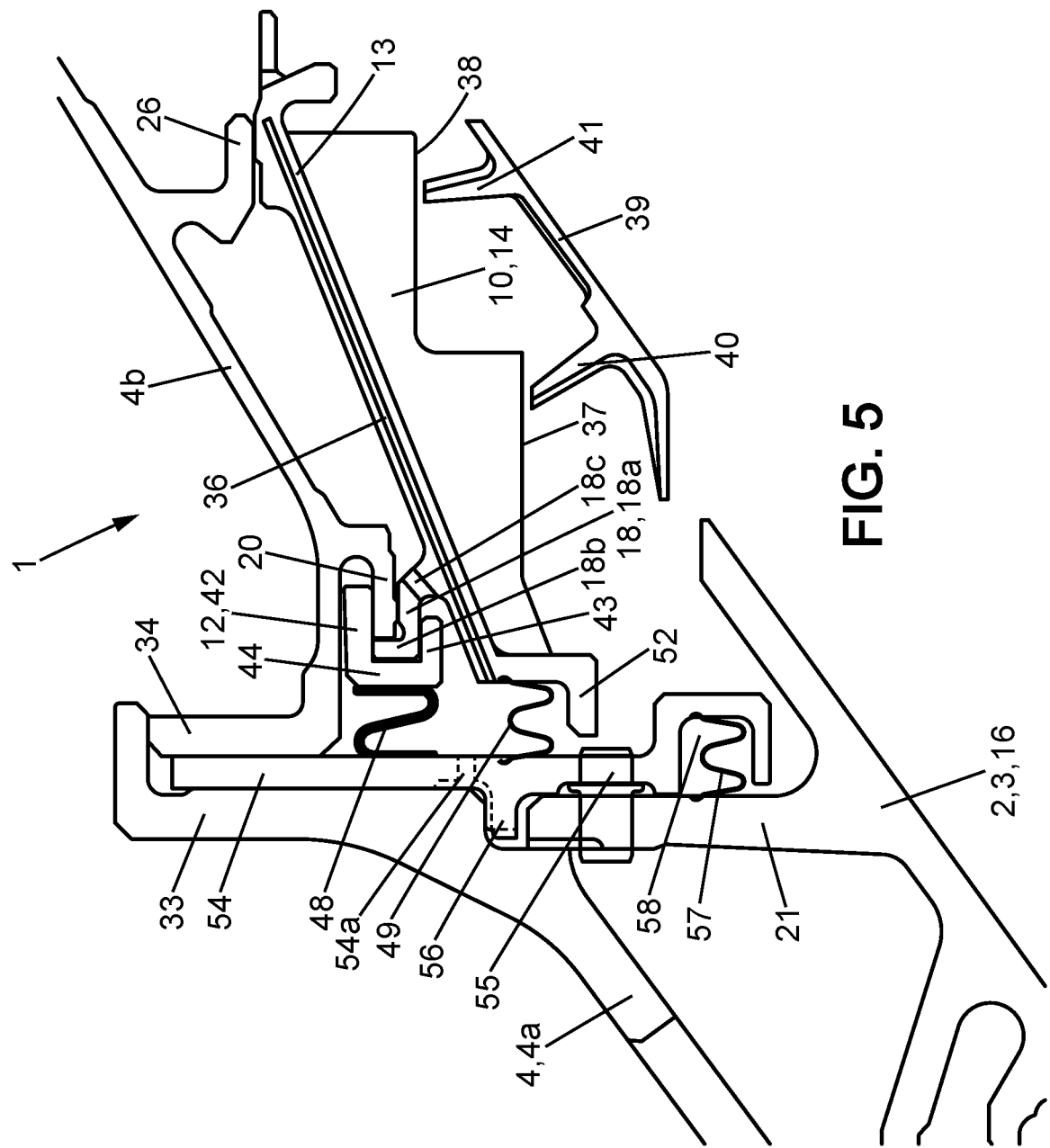
FIG. 5 is a sectional view of a portion of the turbine according to a third embodiment of the disclosure.

FIG. 5 illustrates a third embodiment, which differs from those described above with reference to FIGS. 3 and 4 in that an intermediate element 54 is mounted on the casing 4 downstream from the downstream edge 21 of the nozzle 2. The intermediate element 54 is positioned in relation to the downstream edge 21 by means of at least one positioning or centering block 55. The intermediate element 54 extends radially. The radially outer periphery of the intermediate element 54 is fastened between the radial clamp 33 of the first portion 4a of the casing 4 and the radial clamp 34 of the second portion 4b of the casing 4.

The intermediate element 54 includes an axial edge 56 extending in the upstream direction, radially bearing on a cylindrical surface of the casing 4.

An annular sealing member 57 is mounted between the downstream edge 21 and the intermediate element 54. The sealing member 57 is mounted in a groove 58 of the intermediate element 54. The first sealing member 48 and the second sealing member 49 are located in the same radial plane. It is possible to place a groove on the intermediate element 54 if it is sought to use an Omega type seal.

Holes or bores 54a and 18c are respectively formed in the intermediate element 54 and the upstream tab 18, these holes or bores allowing the flow of a cooling or ventilation air stream.

The invention claimed is:

1. A turbine for a turbine engine extending along an axis, including an annular casing and at least one turbine stage comprising a nozzle and a rotor impeller wheel surrounded by a sealing ring including an abradable element, the impeller wheel and the sealing ring being located downstream from the nozzle, the sealing ring including an upstream end held on the casing by locking means, elastic sealing means in contact with the locking means as well as with the nozzle or the casing so as to press the locking means against the sealing ring, the locking means including a radially outer portion with a C-shaped cross-section and a radial portion extending radially inward from the outer portion, the sealing means including a first elastic seal and a second elastic seal, the two elastic seals bearing on said radial portion, respectively, on either side of the radial portion, wherein the first elastic seal extends axially between the nozzle and the radial portion, wherein the second elastic seal extends axially between the sealing ring and the radial portion.

2. The turbine according to claim 1, wherein the sealing means further include at least one axially deformable annular seal.

3. The turbine according to claim 1, wherein the sealing means further include at least one additional annular seal located radially inside the radially outer portion with the C-shaped cross-section and which is in contact against the nozzle.

4. The turbine according to claim 1, wherein the sealing ring further includes a portion extending axially in an upstream direction, located at least partially facing at least one of the locking means and the sealing means.

5. The turbine according to claim 1, wherein the sealing ring is sectorized and includes a plurality of sectors arranged end-to-end on a circumference about the axis, sealing elements extending between the ends of the circumferentially adjacent ring sectors.

6. The turbine according to claim 4, wherein the sealing ring is sectorized and includes a plurality of sectors arranged end-to-end on a circumference about the axis, sealing elements extending between the ends of the circumferentially adjacent ring sectors, the sealing elements being located at least in said portion of the sealing ring extending axially in the upstream direction.

7. The turbine according to claim 1, wherein the nozzle includes a radially outer shell and a radially inner shell, connected by radial blades, the outer shell including at least one downstream edge extending radially outward from the outer shell and mounted on the casing, said edge extending axially, at least partially, facing the locking means.

8. The turbine according to claim 1, wherein the nozzle includes a radially outer shell and a radially inner shell connected by radial blades, the outer shell including at least one downstream edge extending radially outward from the outer shell and mounted on the casing, a radially outer end of said downstream edge being located radially inside the locking means.

9. The turbine according to claim 1, wherein the sealing ring includes a tab held radially bearing and axially bearing on a portion of the casing, by the locking means.

* * * * *